(12) United States Patent
Ma (10) Patent No.: US 8,280,106 B2
(45) Date of Patent: Oct. 2, 2012

(54) SHADOW AND HIGHLIGHT DETECTION SYSTEM AND METHOD OF THE SAME IN SURVEILLANCE CAMERA AND RECORDING MEDIUM THEREOF

(75) Inventor: Gengyu Ma, Beijing (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 982 days.

(21) Appl. No.: 12/155,839

(22) Filed: Jun. 10, 2008

(65) Prior Publication Data

US 2009/0087025 A1 Apr. 2, 2009

(30) Foreign Application Priority Data

Sep. 29, 2007 (CN) .......................... 2007 1 0151767
Dec. 21, 2007 (KR) ........................ 10-2007-0135842

(51) Int. Cl.
*G06K 9/00* (2006.01)
*G06K 9/34* (2006.01)
(52) U.S. Cl. .................. 382/103; 382/173; 382/174
(58) Field of Classification Search .................. None
See application file for complete search history.

(56) References Cited

U.S. PATENT DOCUMENTS

| | | | | |
|---|---|---|---|---|
| 4,777,360 A | * | 10/1988 | Carner, Jr. | 250/206.1 |
| 5,214,744 A | * | 5/1993 | Schweizer et al. | 382/103 |
| 5,592,567 A | * | 1/1997 | Kilger | 382/199 |
| 2007/0036432 A1 | * | 2/2007 | Xu et al. | 382/173 |

OTHER PUBLICATIONS

Horpraset et al. "A Statistical Approach for Real-time Robust Background Subtraction and Shadow Detection"IEEE ICCV'99 FRAME_RATE workshop, pp. 1-19.*
Stauffer and Grimson in "Learning Patterns of Activity Using Real Time Tracking", Aug. 2000, IEEE Trans on Pattern Analysis and Machine Intelligence, pp. 1-17.*
McKenna et al. In "Tracking Groups of People", 2000, Computer Vision and Image Understanding, 80, pp. 42-56.*

* cited by examiner

*Primary Examiner* — Jason M Repko
*Assistant Examiner* — Jhere Rowland
(74) *Attorney, Agent, or Firm* — Staas & Halsey LLP (57) ABSTRACT

A method and system for detecting a shadow region and a highlight region from a foreground region in a surveillance system, and a recording medium thereof, are provided. The system includes an image capturing unit to capture a new image, a background model unit to receive the new image and update a stored background model with the new image, a difference image obtaining unit to compare the new image with the background model and to obtain a difference image between the new image and the background model, a penumbra region extraction unit to extract a partial shadow region or a partial highlight region by measuring a sharpness of an edge of the difference image and expanding a background region, and an umbra region extraction unit to extract a complete shadow region or a complete highlight region based on the result of the extraction by the penumbra region extraction unit.

25 Claims, 8 Drawing Sheets

SMOOTH EDGE

FIG. 6

SHARP EDGE

SHADOW AND HIGHLIGHT DETECTION SYSTEM AND METHOD OF THE SAME IN SURVEILLANCE CAMERA AND RECORDING MEDIUM THEREOF

CROSS-REFERENCE TO RELATED APPLICATIONS

This application claims the benefit of Chinese Patent Application No. 200710151767.4, filed on Sep. 29, 2007, in the Chinese States Intellectual Property Office, and the benefit of Korean Patent Application No. 10-2007-0135842, filed on Dec. 21, 2007, in the Korean Intellectual Property Office, the disclosures of which are incorporated herein by reference.

BACKGROUND

1. Field

One or more embodiments of the present invention relate to a method and system for detecting a shadow and a highlight, and a recording medium thereof, and more particularly, to a method and system capable of detecting a shadow and a highlight in a surveillance camera, and recording medium thereof.

2. Description of the Related Art

Surveillance cameras are widely used in public places for security purposes. However, additional labor is required to inspect and determine whether a critical incident occurred or is occurring. Therefore, a surveillance system with an intelligent camera that can detect, track, and analyze actions of a human being and other objects is a focus of much research.

Detecting and tracking of a moving object is at the core of many applications that process image sequences. The applications generally attempt to identify an appearance of the moving object and a shadow that moves along with the moving object in a scene. When a foreground is misclassified as a shadow point and thereby the moving object is separated and extracted, the shadow may cause a serious problem. Specifically, due to the shadow cast over another object, the merging of objects, shape distortion of the objects, and loss of the objects may occur.

Since a shadow and a related object generally share two important visual features outlined below, detection of the shadow may be difficult. First, the shadow point is significantly different from a background and thus is detectable as the foreground. Second, the shadow has the same motion as its corresponding object. For this reason, identifying the shadow is critical for still images and image sequences, for example, a video. Currently, the identification of shadows has become an active research area.

Generally, there are three types of schemes for identifying a shadow region and an object region.

A first scheme is based on the assumption that a system is aware of each of a light source, an object shape, and a ground plane. Therefore, when there is a combined region of shadow and object, the first scheme may predict which region is the object and which region is the shadow cast by the object.

A second scheme is based on image constancy. Color constancy indicates that a luminance is reduced in a shadow region to thereby decrease the intensity of a corresponding pixel. However, there is a relatively small change in the hue and saturation of the pixel. Therefore, the second scheme tests hue and saturation information to identify the shadow and the object. Also, texture constancy indicates that even though the intensity is reduced in the shadow region, an edge of the shadow region does not move. However, in the case of a foreground object, both edge and intensity are changed.

A third scheme is based on the edge width. The shadow region includes a complete shadow region and a partial shadow region. The partial shadow region corresponds to a narrow ribbon between the complete shadow region and the background. Also, the partial shadow region corresponds to a portion that gradually changes from the background to the complete shadow region. Therefore, the edge of the shadow region is wide and smooth, whereas the edge of the object region is narrow and sharp.

SUMMARY

One or more embodiments of the present invention provide a method and system that can identify a shadow region and a highlight region from a foreground region in a surveillance camera system, without restrictions such as assumptions about a clean background, a texture background, a light source location, and the like, and a recording medium thereof.

Additional aspects and/or advantages will be set forth in part in the description which follows and, in part, will be apparent from the description, or may be learned by practice, of the invention.

According to an aspect of the present invention, a system for detecting a shadow region and a highlight region is provided The system includes an image capturing unit to capture a new image, a background model unit to receive the new image and update a stored background model with the new image, a difference image obtaining unit to compare the new image with the background model and to obtain a difference image between the new image and the background model, a penumbra region extraction unit to extract a partial shadow region or a partial highlight region by measuring a sharpness of an edge of the difference image and expanding a background region, and an umbra region extraction unit to extract a complete shadow region or a complete highlight region based on the result of the extraction.

According to another aspect of the present invention, a method of detecting a shadow region and a highlight region is provided. The method includes capturing a new image, comparing the new image with a background model and updating the background model with the new image, obtaining a difference image between the new image and the background image, extracting a partial shadow region or a partial highlight region by measuring a sharpness of a edge of the difference image and expanding a background region, and extracting a complete shadow region or a complete highlight region based on the result of the extraction.

In an aspect of the present invention, the present invention provides at least one computer medium recording the method of detecting the shadow region and the highlight region.

BRIEF DESCRIPTION OF THE DRAWINGS

These and/or other aspects and advantages will become apparent and more readily appreciated from the following description of the embodiments, taken in conjunction with the accompanying drawings of which:

FIG. 11A-11D, illustrate experimental results of highlight extraction and experimental results of shadow extraction, according to an exemplary embodiment of the present invention.

DETAILED DESCRIPTION OF EMBODIMENTS

Reference will now be made in detail to embodiments, examples of which are illustrated in the accompanying drawings, wherein like reference numerals refer to the like elements throughout. Embodiments are described below to explain the present invention by referring to the figures.

Figure 1:
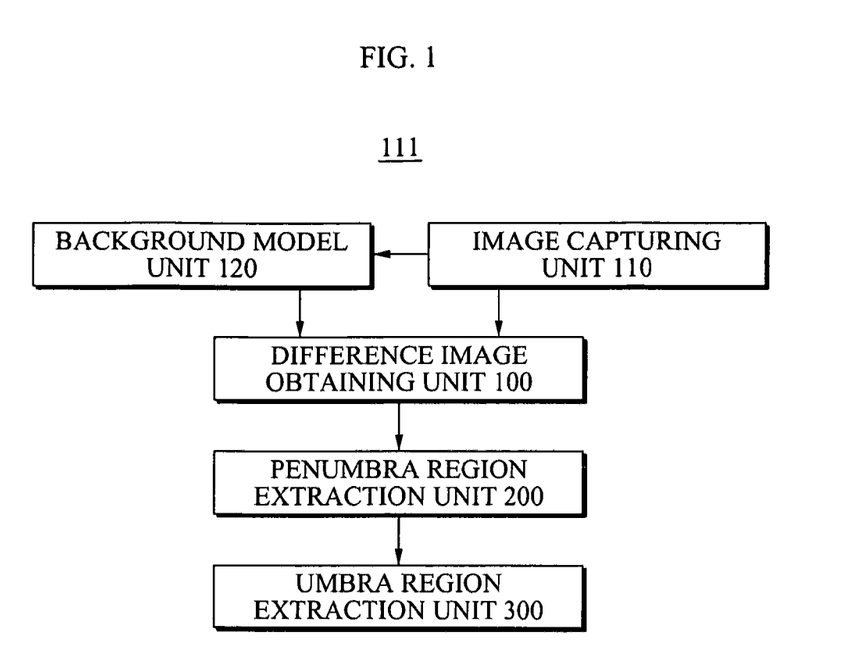
FIG. 1 illustrates a shadow detection system, according to an exemplary embodiment of the present invention.

FIG. 1 is a block diagram illustrating a shadow detection system 111 according to an exemplary embodiment of the present invention. One or more embodiments of the present invention describe detection of a shadow region, and embodiments may also be applicable to detection of a highlight region.

Referring to FIG. 1, the shadow detection system 111 includes, for example: an image capturing unit 110 to capture a new image and input the new image in a background model unit 120; the background model unit 120 to include the background model and update the background model with the new image; a difference image obtaining unit 100 to compare the new image with the background model and to obtain a difference image between the new image and the background model; a penumbra region extraction unit 200 to extract a partial shadow region; and an umbra region extraction unit 300 to extract a complete shadow region.

According to an aspect of the present invention, the penumbra region extraction unit 200 may extract a partial highlight region. Also, the umbra region extraction unit 300 may extract a complete highlight region.

The image capturing unit 110 captures the new image in the shadow detection system. The new image is input in the background model unit 120 and is compared with the background model to obtain the difference image.

The background model is a statistical model about the history of a scene. In an exemplary embodiment, the background model is only a reference image of a background without any foreground object. In another implementation, the background model is a collection of pixel distributions. In a Gaussian Mixture model, each pixel distribution is given by Equation 1 below:

$$\Sigma w_i \cdot N(u_i, \sigma_i) \qquad \text{Equation 1}$$

where $w_i$ is a weight of each unit Gaussian, and $N(u_i, \sigma_i)$ is a unit Gaussian distribution with a center $u_i$ and a variance $\sigma_i$.

The background model unit 120 updates the background model. In order to update the mixture Gaussian background model, there is a need to compare a pixel of the new image (hereinafter, referred to as a new pixel) with each unit Gaussian distribution. When the new pixel belongs to a unit Gaussian, the background model unit 120 updates a center, a variance, and a weight of the unit Gaussian. The background model unit 120 updates the center of the unit Gaussian by assigning a weight to an original center of the unit Gaussian and a color of the pixel and obtains the average thereof. The background model unit 120 further updates the variance by obtaining the average of an original variance of the unit Gaussian and a distance from the new pixel to the original center of the unit Gaussian, and updates the weight of the unit Gaussian by increasing the weight of the unit Gaussian and decreasing weights of the other unit Gaussians.

Conversely, when the pixel is excluded from all unit Gaussians, the background model unit 120 deletes a unit Gaussian with a smallest weight and adds a new unit Gaussian centered at the pixel.

Based on the assumption that the background occupies a pixel for a relatively long period of time, when a pixel belongs to a unit Gaussian with a great weight, the pixel belongs to the background. Otherwise, the pixel belongs to a foreground, a shadow region, or a highlight region. Embodiments of the present invention may identify which type of region each changed pixel belongs to.

Figure 11:
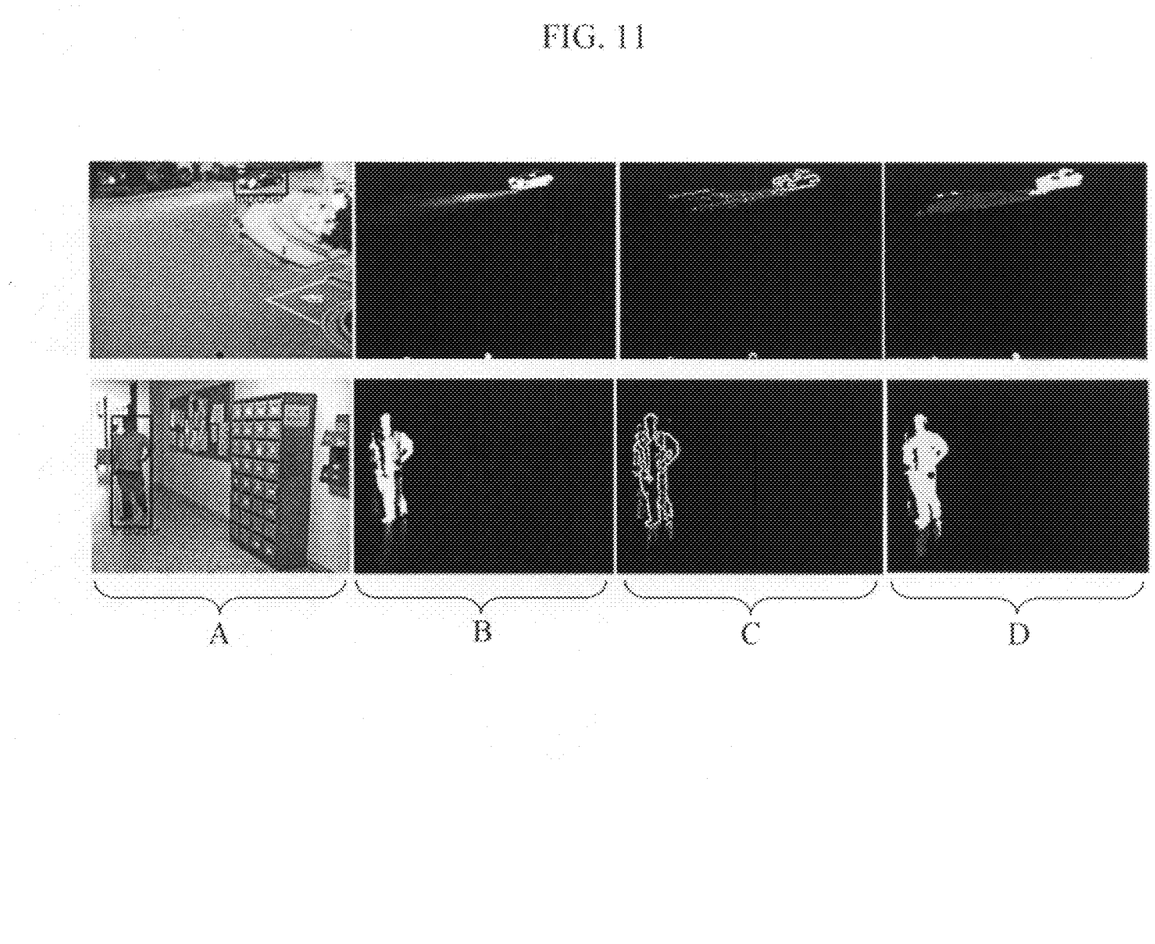

In the case of the highlight region, the situation is similar. As shown in FIG. 11, the border of the highlight region changes gradually. The only difference is that the highlight region is brighter than the original background, whereas the shadow region is darker than the background. Based on this, the shadow detection system detects the shadow and the highlight using the same scheme. In a latter part of the present specification, embodiments of the present invention will be described using the shadow region as an example. However, as described above, the highlight region also may be detected using the same scheme.

Figure 2:
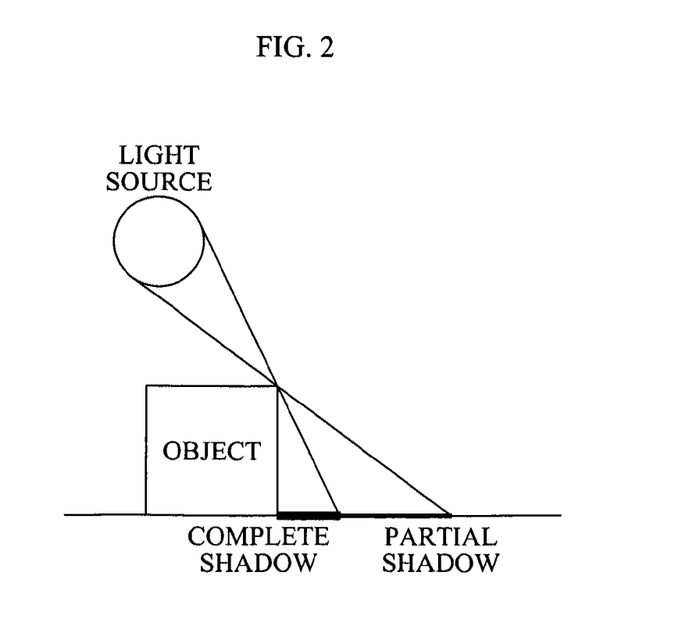
FIG. 2 illustrates an example of a partial shadow region and a complete shadow region as described in the present invention.

Hereinafter, a partial shadow region phenomenon will be described prior to describing the shadow detection. FIG. 2 illustrates arrangement of a partial shadow region and a complete shadow region as described in embodiments of the present invention.

Generally, a light source is not a point of light. When an object blocks all the light radiated from the light source, an occluded region becomes a complete shadow region. In the complete shadow region, pixels become darker at nearly the same ratio. As shown in FIG. 2, when the light source is partially blocked by the object, a partially lit region corresponding to a right-hand side of the complete shadow region becomes a partial shadow region. In the partial shadow region, the occluded light gradually increases. Therefore, the difference of darkness of pixels between the complete shadow region and the partial shadow region gradually changes from zero near the complete shadow region to a maximum value at a point in the partial shadow region furthest from the complete shadow region.

The difference image obtaining unit 100 obtains the difference image between the new image and the background image and stores the difference image. The difference image obtaining unit 100 compares a pixel of the new image with a center of each unit Gaussian of the background model, and finds a closest unit Gaussian of the background region. Next, the difference image obtaining unit 100 determines whether a distance from the closest unit Gaussian of the background region is less than a variance of the closest unit Gaussian of the background region.

When the distance is less than the variance, the difference image obtaining unit 100 labels the pixel as background and sets a corresponding difference of the difference image as zero. Conversely, when the distance is greater than or equal to the variance, the difference image obtaining unit 100 stores the distance as the corresponding difference in the difference image.

Figure 3:
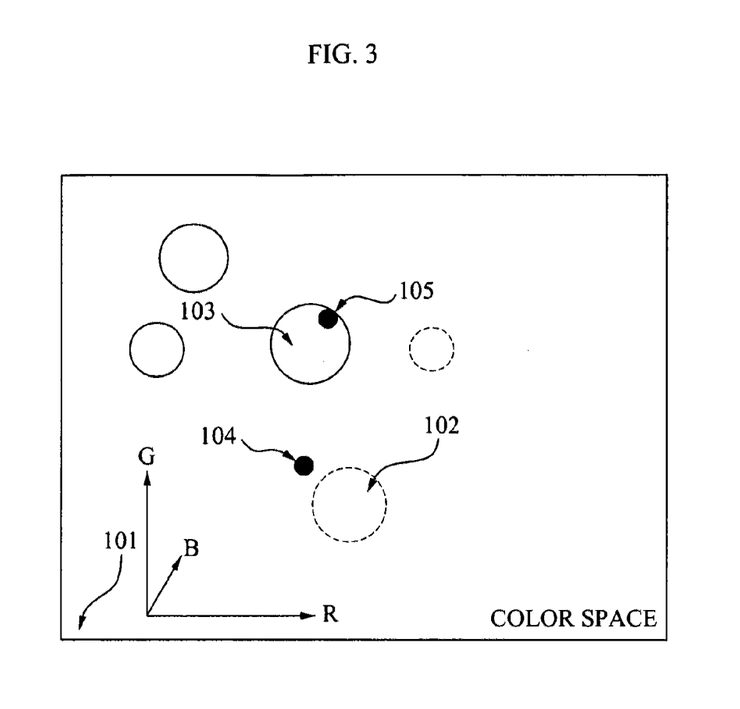
FIG. 3 illustrates a method of computing a difference image, according to an exemplary embodiment of the present invention.

FIG. 3 illustrates a method of computing the difference image. A space is a color space 101 such as a red-green-blue (RGB) space. A first region is a unit Gaussian 102 of a foreground region or a shadow region. A second region is a unit Gaussian 103 of a background region and a point is an input pixel 104. The input pixel 104 is outside of unit Gaussians 103 of the background region. A distance from the input pixel 104 to the closest unit Gaussian 103 of the background region is stored in the difference image. Another input pixel 105 is within the range of the unit Gaussian 103 of the background region and thus is labeled as the background. In this manner, the difference image obtaining unit 100 stores the difference image.

Figure 4:
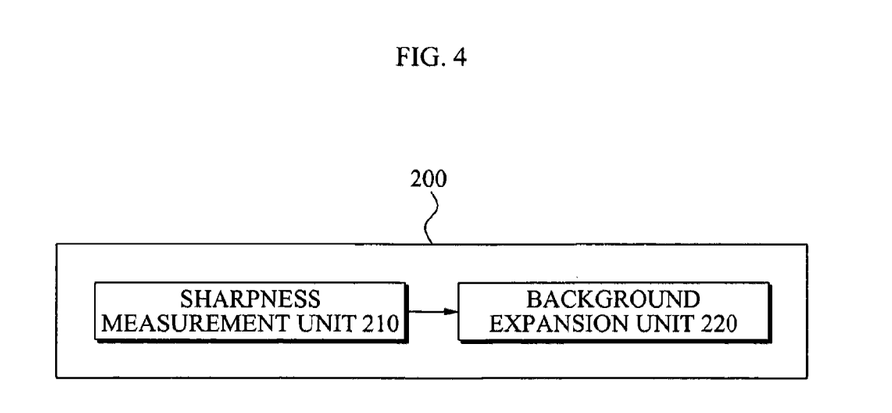
FIG. 4 illustrates a structure of a penumbra region extraction unit, according to an exemplary embodiment of the present invention.

FIG. 4 illustrates a structure of the penumbra region extraction unit 200 of FIG. 1.

The penumbra region extraction unit 200 includes, for example, a sharpness measurement unit 210 and a background expansion unit 220. The sharpness measurement unit 210 measures a sharpness of the edge of the difference image. When the sharpness is relatively large, it indicates that the difference between adjacent pixels in the edge is also relatively large. The background expansion unit 220 expands the background region through a horizontal and vertical scan. When a foreground pixel is reachable from the background without crossing any sharp edge, the foreground pixel is labeled as the partial shadow region.

Figure 5:
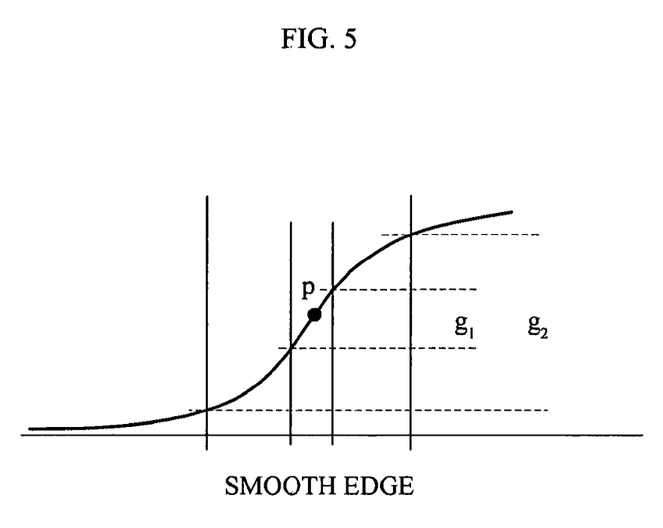
FIG. 5 illustrates a wide and smooth edge, according to an exemplary embodiment of the present invention.
Figure 6:
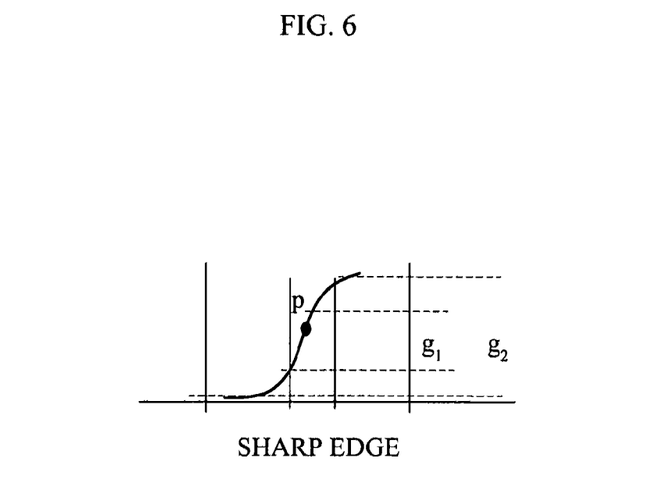
FIG. 6 illustrates a narrow and sharp edge, according to an exemplary embodiment of the present invention.

Generally, the partial shadow region has a relatively wider and smoother edge, whereas the border of the object has a relatively narrow and sharp edge. According to an aspect of the present invention, the sharpness measurement unit 210 is used to measure the sharpness of the edge. For a pixel p, the sharpness measurement unit 210 computes gradients of the pixel in a small scale and a large scale, and obtains gradient g1 of the small scale and gradient g2 of the large scale. By dividing g1 by g2, the sharpness of the pixel p is set to sharp(p)=g1/g2. For example, FIG. 5 illustrates a smooth edge and FIG. 6 illustrates a sharp edge. Although the absolute gradient of FIG. 5 is similar to the absolute gradient of FIG. 6, the total gradient g2, according to a measurement scheme of an embodiment of the present invention, is relatively small and thus the sharpness, sharp(p)=g1/g2, is relatively large.

Figure 7:
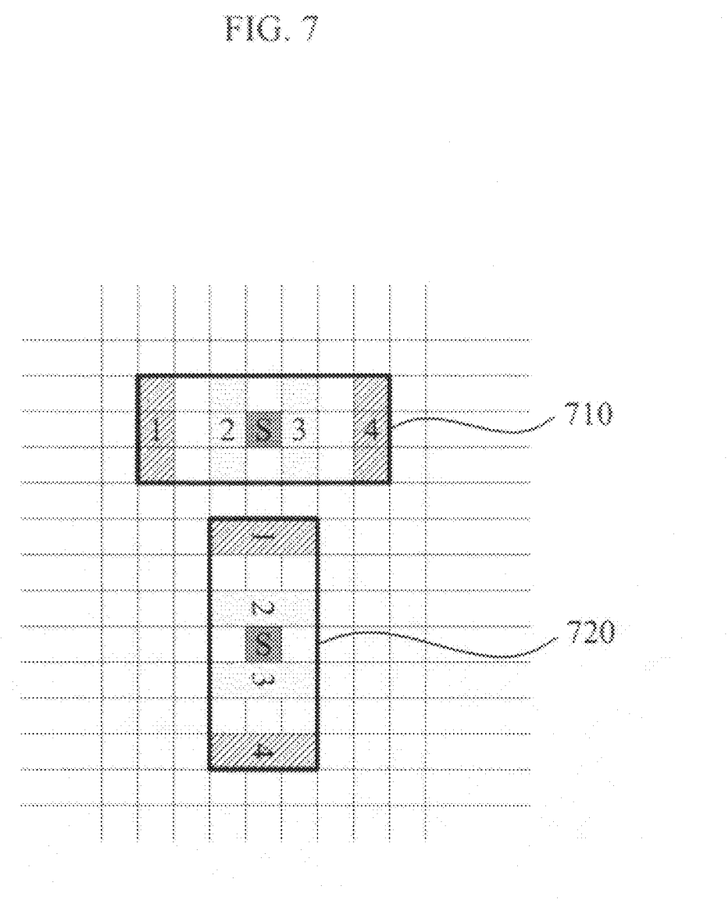
FIG. 7 illustrates a filter for measuring a sharpness of each horizontal pixel and vertical pixel, according to an exemplary embodiment of the present invention.

In order to compute the sharpness, the sharpness measurement unit 210 uses a filter shown in FIG. 7. A horizontal filter 710 and a vertical filter 720 are used to compute the sharpness. Initially, vi for calculating gradient(g1, g2), as suggested in Equation 2 below, is computed by summing up grey values of pixels in region i. Here, i indicates regions 1, 2, 3, and 4 shown in FIG. 7. S denotes the pixel p. Next, the sharpness using gradients(g1, g2) is computed by Equation 2 below. A is a constant used to control a small gradient. Also, if $|v2-v3|<thr_{grad}$, it indicates the gradient at the pixel p is very small. In this instance, the sharpness of the pixel p is set as 0. The threshold $thr_{grad}$ is a predetermined system parameter. The sharpness is an absolute value and is computed by Equation 2 below:

$$\text{Sharp}(p) = |v2 - v3| / (|v1 - v4| + A)$$

where $g1 = |v2 - v3|, g2 = |v1 - v4| + A$. Equation 2

The background expansion unit 220 extracts the partial shadow region by applying the horizontal and vertical scan. For each horizontal scan line, the background expansion unit 220 finds every background region and expands the background region towards a left-hand side direction. When it is assumed that a left-hand side pixel of the background region is $p_L$, and if $\text{sharp}(p_L) < thr_{sharp}(\text{Shadow})$ and $\text{diff}(p_L) < thr_{diff}(\text{Shadow})$, the pixel is labeled as the partial shadow region. In this instance, $thr_{sharp}(\text{Shadow})$ is a sharpness threshold of the shadow and $thr_{diff}(\text{Shadow})$ is a difference threshold of the shadow. Also, if $\text{sharp}(p_L) < thr_{sharp}(\text{Highlight})$ and $\text{diff}(p_L) > thr_{diff}(\text{Highlight})$, the pixel is labeled as the partial highlight region. In this instance, $thr_{sharp}(\text{Highlight})$ is a sharpness threshold of the highlight and $thr_{diff}(\text{Highlight})$ is a difference threshold of the highlight.

Here, $\text{diff}(p_L)$ is a difference, absolute value, between the pixel $p_L$ and the background model and is a difference between a current pixel value and a middle point in the background model in a corresponding pixel location. This is stored in the difference image. The sharpness threshold $thr_{sharp}$ and the difference threshold $thr_{diff}$ are two system parameters.

The above operation is horizontally repeated until the above conditions are not satisfied. When the expanding operation to a left-hand side direction is completed, the expanding operation is performed to a right-hand side direction in the same way.

After the horizontal scan, most of the partial shadow region is detected. However, due to image noise, some sharp edges may block the horizontal expansion. Therefore, each vertical line is scanned in a similar way. If the sharpness of a nearest upper pixel p in the background region is less than $thr_{sharp}(\text{Shadow})$ and $\text{diff}(p) < thr_{diff}(\text{Shadow})$, the pixel labeled as a partial shadow region. Also, when the sharpness is less than $thr_{sharp}(\text{Highlight})$ and $\text{diff}(p) > thr_{diff}(\text{Highlight})$, the pixel is labeled as a partial highlight region. The above operation is repeated until the above conditions are not satisfied and the expanding operation is performed with respect to a lower direction in the same way. In this instance, diff(p) is a difference between the pixel p and the background model. The sharpness threshold $thr_{sharp}$ and the difference threshold $thr_{diff}$ are two system parameters.

After completing the operation, the partial shadow region is extracted using the sharpness measurement unit 210 and the background expansion unit 220.

Figure 8:
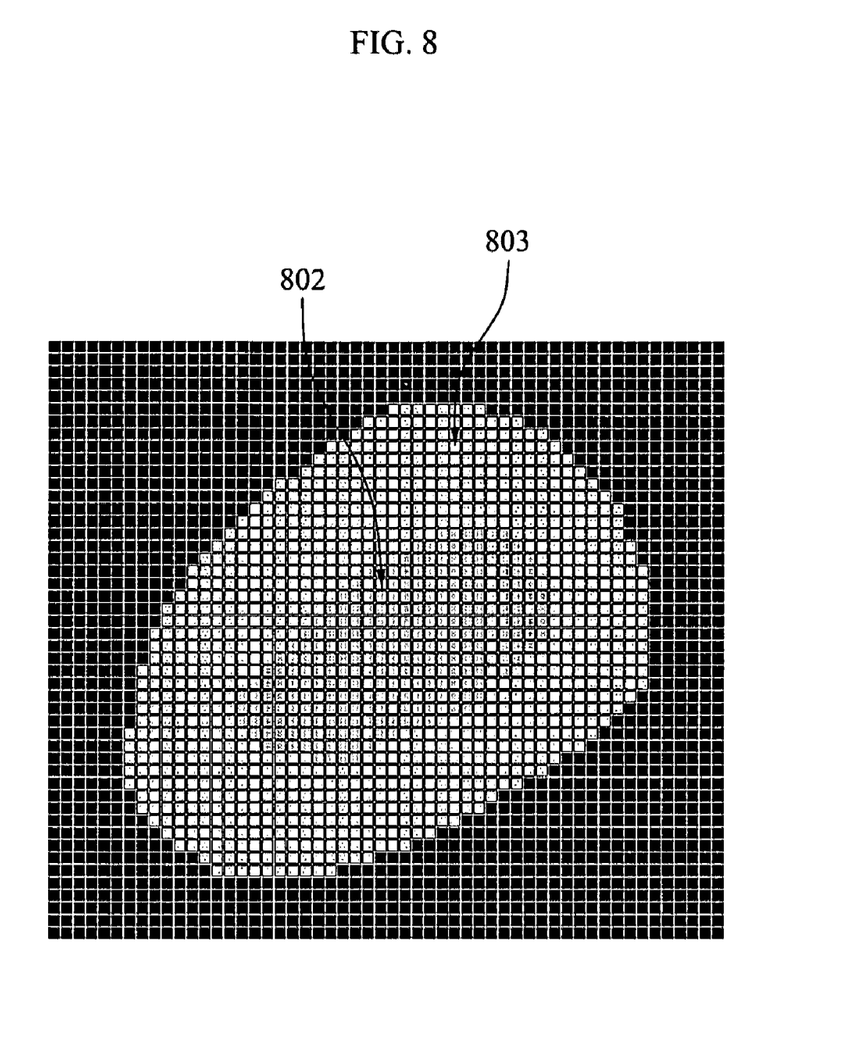
FIG. 8 illustrates locating a complete shadow region based on an extraction result of a partial shadow region, according to an exemplary embodiment of the present invention.
Figure 9:
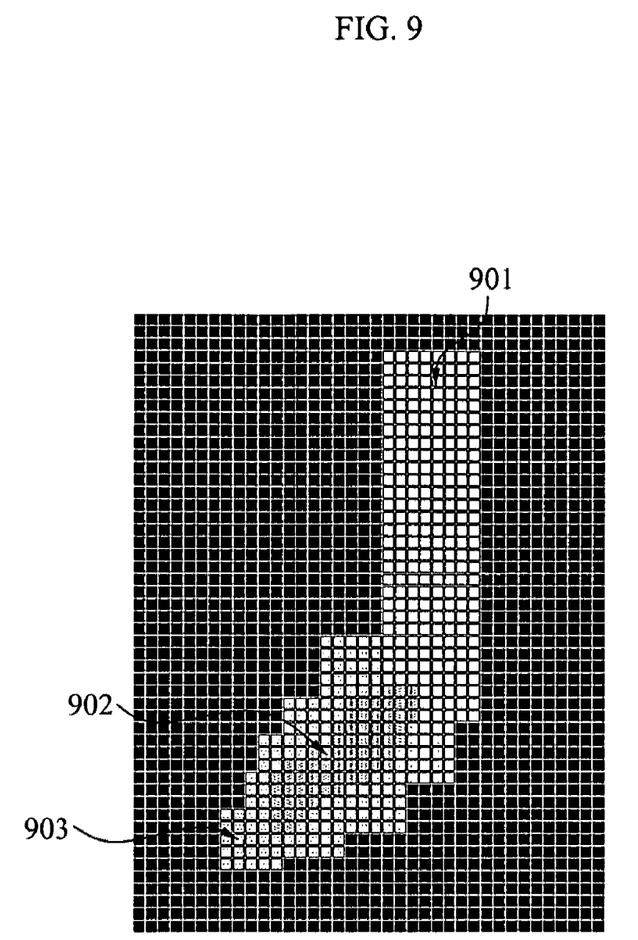
FIG. 9 illustrates locating a complete shadow region based on an extraction result of a partial shadow region when the complete shadow region approaches a foreground object, according to an exemplary embodiment of the present invention.

The umbra region extraction unit 300 extracts a completed shadow using a spatial constraint. FIGS. 8 and 9 illustrate two typical situations.

FIG. 8 illustrates locating a complete shadow region, according to an extraction result of a partial shadow region.

Referring to FIG. 8, according to an aspect of the present invention, when a predetermined region is surrounded by a partial shadow region, the entire region is labeled as a complete shadow region. In FIG. 8, a region 802 is the complete shadow region and another region 803 is the partial shadow region. Specifically, since the region 802 is surrounded by the partial shadow region 803, the region 802 is labeled as the complete shadow region.

FIG. 9 illustrates locating a complete shadow region, according to an extraction result of a partial shadow region, when the complete shadow region approaches a foreground object.

Referring to FIG. 9, a region 901 is an object region, another region 902 is the complete shadow region, and still another region 903 is a partial shadow region. According to an aspect of the preset invention, when a part of a foreground region is surrounded by a partial shadow region, the part also must be labeled as the complete shadow region, like the region 902. Embodiments of the present invention apply a horizontal and vertical scan to clarify whether the part of the foreground is surrounded by the partial shadow region.

When a scanned line region includes a partial shadow region-object region-partial shadow region pattern and the length of the object region is not too long, that is, when the length of an object corresponding to a system parameter is less than $\text{Thr}_{length}(\text{Shadow})$, the object region is labeled as the complete shadow region. Also, when the scanned line region includes a partial highlight region-object region-partial highlight region pattern and the length of the object region is not too long, that is, when the length of the object region that is the system parameter is less than $\text{Thr}_{length}(\text{highlight})$, the object region is labeled as the complete highlight region.

Figure 10:
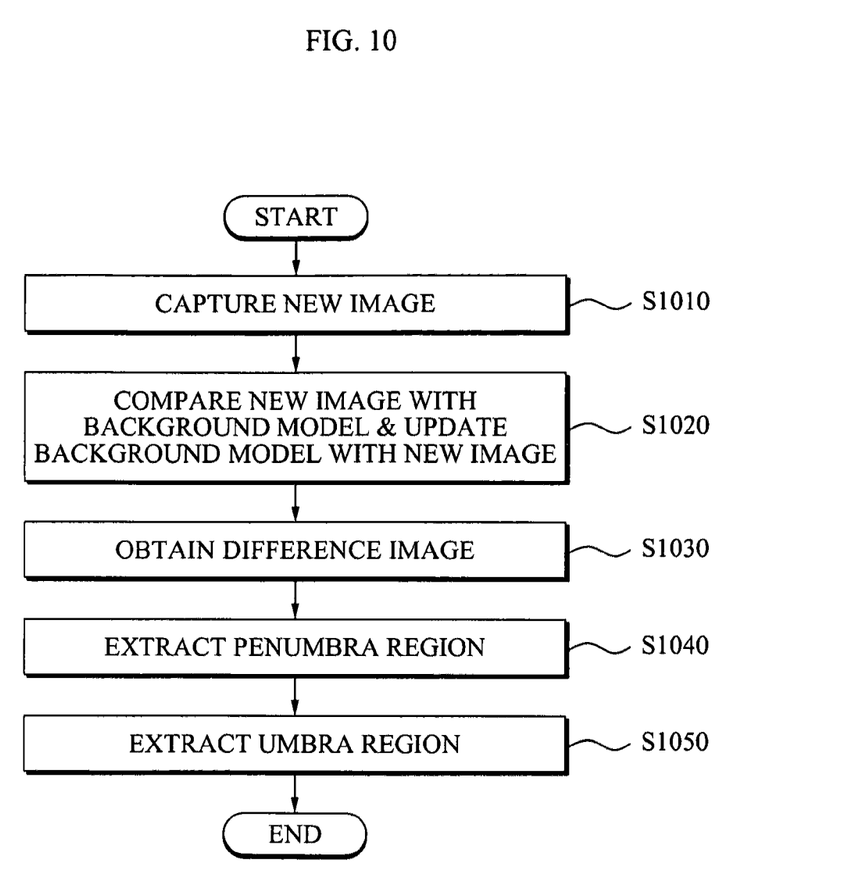
FIG. 10 illustrates a method of identifying a shadow region and a highlight region from a foreground region, according to an exemplary embodiment of the present invention.

FIG. 10 illustrates a method of identifying a shadow region and a highlight region from a foreground region, according to an exemplary embodiment of the present invention.

In operation S1010, the image capturing unit 110 captures a new image. In operation S1020, the background model unit 120 compares the new image with a background model, and updates the background model with the new image. In operation S1030, the difference image obtaining unit 100 obtains a difference image between the new image and the background model. In operation S1040, the penumbra region extraction unit 200 measures a sharpness of an edge in the difference image, extracts a background image, and thereby extracts a penumbra region, which is a partial shadow region or partial highlight region. In operation S1050, the umbra region extraction unit 300 extracts an umbra region, which is a complete shadow region or a complete highlight region, based on the result of the extraction by the penumbra region extraction unit 200.

FIG. 11, images A, B, C, and D, illustrate two experimental results. One is a highlight extraction result and another is a shadow extraction result.

In FIG. 11, two experimental results are shown. From left to right, there are original images A, difference images B, sharpness images C, and object and shadow/highlight extraction results D, respectively.

The top images show the highlight extraction result. In this instance, a road is illuminated by a headlight of a vehicle. The bottom images show an indoor scene. Here, a background light was relatively bright and made a large shadow region on the ground. However, it can be seen that the border of the light region is very smooth. When using a sharpness measurement scheme according to embodiments of the present invention, the sharpness of the border is less than the border of the general object. Therefore, the shadow region is successfully extracted.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, Blu Ray disks), transmission media, and elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, a surveillance camera system may identify a shadow region from a foreground region, without restrictions such as a clean background, a texture background, assumptions about a light source location, and the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system for detecting a shadow region and a highlight region, the system comprising:
a processor to control one or more processor-executable units;
an image capturing unit to capture a new image;
a background model unit to receive the new image and update a stored background model with the new image;
a difference image obtaining unit to compare the new image with the background model and to obtain a difference image between the new image and the background model;
a penumbra region extraction unit to extract a partial shadow region or a partial highlight region by measuring a sharpness of an edge of the difference image and expanding a background region by way of a horizontal and vertical scan of the background region, wherein a foreground pixel is determined as one of the partial shadow region or the partial highlight region when the foreground pixel is reachable from the background region without crossing a sharp edge; and
an umbra region extraction unit to extract a complete shadow region or a complete highlight region based on the result of the extraction by the penumbra region extraction unit.

2. The system of claim 1, wherein the background model is a collection of pixel distributions, and a color distribution of each pixel is described in a Gaussian Mixture model given by, $$\Sigma w_i \cdot N(u_i, \sigma_i),$$

where $w_i$ is a weight of each unit Gaussian, and $N(u_i, \sigma_i)$ is a unit Gaussian distribution with a center $u_i$ and a variance $a\sigma_i$.

3. The system of claim 2, wherein the background model is formed to include a pixel in the background region when the pixel belongs to a unit Gaussian with a relatively great weight.

4. The system of claim 2, wherein the background model unit compares a pixel of the new image with the Gaussian Mixture model, and when the pixel of the new image belongs to a predetermined unit Gaussian, the background model unit updates the center, the variance, and the weight of the unit Gaussian, and when the pixel is excluded from all unit Gaussians, the background model unit deletes a unit Gaussian with a smallest weight and adds a new unit Gaussian centered at the pixel.

5. The system of claim 4, wherein when the pixel of the new image belongs to the predetermined unit Gaussian, the background model unit updates the center of the unit Gaussian by assigning a weight to an original center of the unit Gaussian and a color of the pixel and obtaining the average thereof, and updates the variance by obtaining the average of an original variance of the unit Gaussian and a distance from the pixel to the original center of the unit Gaussian, and updates the weight by increasing the weight of the unit Gaussian and decreasing weights of the other unit Gaussians.

6. The system of claim 2, wherein the difference image obtaining unit finds a unit Gaussian of the background model closest to the pixel, and when the distance between the pixel and a center of the closest unit Gaussian is less than a variance of the unit Gaussian, labels the pixel as a background and sets a difference of the difference image as zero, and when the distance is greater than or equal to the variance, sets the difference as the distance and stores the difference image.

7. The system of claim 1, wherein the penumbra region extraction unit comprises:
 a sharpness measurement unit to measure the sharpness of the edge of the difference image; and
 a background expansion unit to horizontally and vertically scan the background region of the background model and expand the background region of the background model by labeling a predetermined pixel of the background region as the partial shadow region when a sharpness of the pixel of the background region of the background model is less than a sharpness threshold of a partial shadow and when a difference between the pixel and the background model is less than a difference threshold of the partial shadow, and labeling the pixel as the partial highlight region when the sharpness of the pixel is less than a sharpness threshold of a highlight and when the difference between the pixel and the background model is greater than a difference threshold of the highlight.

8. The system of claim 7, wherein the sharpness measurement unit computes gradients of the pixel of the new image in a small scale and a large scale respectively, and computes, as the sharpness of the pixel, a value that is obtained by dividing the small scale by the large scale or by dividing the small scale by a sum of the large scale and a constant.

9. The system of claim 8, wherein the sharpness measurement unit sets the sharpness as zero when the sharpness of the pixel is less than a predetermined threshold.

10. The system of claim 7, wherein the background expansion unit labels, as the partial shadow region, a nearest left-hand side pixel in the background region, when a sharpness of the nearest left-hand side pixel is less than a sharpness threshold of the shadow and the difference is less than a difference threshold of the shadow, and
 the background expansion unit labels the pixel as the partial highlight region when the sharpness is less than a sharpness threshold of the highlight and the difference is greater than a difference threshold of the highlight, and
 the background expansion unit repeats the operation with respect to a subsequent left-hand side pixel until the above conditions are not satisfied, and performs the expanding operation to a right-hand side direction in the same way and thereby extracts the partial shadow region or the partial highlight region.

11. The system of claim 7, wherein the background expansion unit labels, as the partial shadow region, a nearest upper pixel in the background region when a sharpness of the nearest upper pixel is less than a sharpness threshold of the shadow and the difference is less than a difference threshold of the shadow, and
 the background expansion unit labels the pixel as the partial highlight region when the sharpness is less than a sharpness threshold of the highlight and the difference is greater than a difference threshold of the highlight, and
 the background expansion unit repeats the operation with respect to a subsequent upper pixel until the above conditions are not satisfied and performs the expanding operation in a lower direction in the same way and thereby extracts the partial shadow region or the partial highlight region.

12. The system of claim 1, wherein the umbra region extraction unit labels a predetermined region as the complete shadow region when the region is surrounded by the partial shadow region, and labels the region as the complete highlight region when the region is surrounded by the partial highlight region.

13. The system of claim 12, wherein the umbra region extraction unit labels a part of a foreground region as the complete shadow region by applying a horizontal and vertical scan when the part is surrounded by the partial shadow region or the partial highlight region,
 the umbra region extraction unit labels an object region as the complete shadow region when the scanned line region has a partial shadow region-object region-partial shadow region pattern and the length of the object region is less than a length threshold of the shadow, and
 the umbra region extraction unit labels the object region as the complete highlight region when the scanned line region has a partial highlight region-object region-partial highlight region pattern and the length of the object region is less than a length threshold of the highlight.

14. A method of detecting a shadow region and a highlight region, the method comprising:
 capturing a new image;
 comparing the new image with a background model and updating the background model with the new image;
 obtaining a difference image between the new image and the background image;
 extracting a partial shadow region or a partial highlight region by measuring a sharpness of a edge of the difference image and expanding a background region by way of a horizontal and vertical scan of the background region;
 determining a foreground pixel as one of the partial shadow region or the partial highlight region when the foreground pixel is reachable from the background region without crossing a sharp edge; and
 extracting a complete shadow region or a complete highlight region based on the result of the extraction of the partial shadow region or the partial highlight region.

15. The method of claim 14, wherein the background model is a collection of pixel distributions and a color distribution of each pixel is described in a Gaussian Mixture model, given by, $$\Sigma w_i \cdot N(u_i, \sigma_i),$$

where $w_i$ is a weight of each unit Gaussian, and $N(u_i, \sigma_i)$ is a unit Gaussian with a center $u_i$ and a variance $\sigma_i$.

16. The method of claim 15, wherein the updating comprises:
 determining whether a pixel of the new image belongs to a predetermined unit Gaussian in the Gaussian Mixture model;
 when the pixel belongs to the unit Gaussian, updating the center and the variance of the unit Gaussian, increasing a weight of the Gaussian, and decreasing weights of the other unit Gaussians, and thereby updating the weight of the unit Gaussian; and when the pixel is excluded from all unit Gaussians, deleting a unit Gaussian with a smallest weight and adding a new unit Gaussian centered at the pixel.

17. The method of claim 15, wherein the obtaining comprises:
comparing a pixel of the new image with a center of each unit Gaussian in the background model, and locating a unit Gaussian closest to the center;
determining whether a distance between the pixel and the center of the closest unit Gaussian is less than a variance of the closest unit Gaussian;
when the distance is less than the variance, labeling the pixel as a background and setting a difference of the difference image as zero; and
when the distance is greater than or equal to the variance, setting the difference as the distance and thereby storing the difference image.

18. The method of claim 14, wherein the extracting of the partial shadow region or the partial highlight region comprises:
computing gradients of a pixel of the new image in a small scale and a large scale respectively; and
measuring a sharpness of the pixel by dividing the small scale by the large scale, or by dividing the small scale by a sum of the large scale and a constant.

19. The method of claim 18, wherein the measuring sets the sharpness of the pixel as zero when the small scale is less than a predetermined threshold.

20. The method of claim 14, wherein the operation of expanding the background region in the extracting of the partial shadow region or the partial highlight region comprises:
locating every background region of each horizontal scan line and horizontally expanding the background region for each pixel with respect to each horizontal scan line; and
locating every background region of each vertical scan line and vertically expanding the background region for each pixel with respect to each vertical scan line.

21. The method of claim 20, wherein the operation of horizontally expanding the background region labels, as the partial shadow region, a nearest left-hand side pixel in the background region, when a sharpness of the nearest left-hand side pixel is less than a sharpness threshold of the shadow and the difference is less than a difference threshold of the shadow, and
labels the pixel as the partial highlight region when the sharpness is less than a sharpness threshold of the highlight and the difference is greater than a difference threshold of the highlight, and
the operation is repeated with respect to a subsequent left-hand side pixel until the above conditions are not satisfied, and the expanding operation is performed in a right-hand side direction in the same way.

22. The method of claim 20, wherein the operation of vertically expanding the background region labels, as the partial shadow region, a nearest upper pixel in the background region when a sharpness of the nearest upper pixel is less than a sharpness threshold of the shadow and the difference is less than a difference threshold of the shadow, and
labels the pixel as the partial highlight region when the sharpness is less than a sharpness threshold of the highlight and the difference is greater than a difference threshold of the highlight, and
the operation is repeated with respect to a subsequent upper pixel until the above conditions are not satisfied and the expanding operation is performed to a lower direction in the same way.

23. The method of claim 14, wherein the extracting of the complete shadow region or the complete highlight region comprises:
labeling a predetermined region as the complete shadow region when the region is surrounded by the partial shadow region, and labeling the region as the complete highlight region when the region is surrounded by the partial highlight region; and
labeling a part of a foreground region as the complete shadow region by applying a horizontal and vertical scan when the part is surrounded by the partial shadow region, and labeling the part as the complete highlight region by applying the horizontal and vertical scan when the part of the foreground region is surrounded by the partial highlight region.

24. The method of claim 23, wherein the labeling of the part as the complete shadow region or the complete highlight region labels an object region as the complete shadow region when the scanned line region has a partial shadow region-object region-partial shadow region pattern and the length of the object region is less than a length threshold of the shadow, and
labels the object region as the complete highlight region when the scanned line region has a partial highlight region-object region-partial highlight region pattern and the length of the object region is less than a length threshold of the highlight.

25. At least one non-transitory medium comprising computer readable instructions to control at least one processing element in a computer to implement the method of claim 14.

* * * * *

UNITED STATES PATENT AND TRADEMARK OFFICE
CERTIFICATE OF CORRECTION

PATENT NO. : 8,280,106 B2  
APPLICATION NO. : 12/155839  
DATED : October 2, 2012  
INVENTOR(S) : Gengyu Ma It is certified that error appears in the above-identified patent and that said Letters Patent is hereby corrected as shown below:

On the Title Page, Column 1, Item (75) (Inventor); Line 1; Delete "Beljing" and insert -- Beijing --, therefor.

In the Claims:

Column 8; Line 52; In Claim 2, delete "a$\sigma_i$" and insert -- $\sigma_i$ --, therefor.

Signed and Sealed this  
Fourteenth Day of May, 2013

Teresa Stanek Rea  
*Acting Director of the United States Patent and Trademark Office*